UNITED STATES PATENT OFFICE.

HERMAN HIRSCH, OF SAN ANTONIO, TEXAS.

CATTLE AND POULTRY FOOD AND PROCESS OF PRODUCING SAME.

1,291,518.      Specification of Letters Patent.      Patented Jan. 14, 1919.

No Drawing.      Application filed September 21, 1917. Serial No. 192,432.

*To all whom it may concern:*

Be it known that I, HERMAN HIRSCH, a citizen of the United States, residing at 628 W. Colquitt Place, in the city of San Antonio, county of Bexar, and State of Texas, have invented new and useful Improvements in Cattle and Poultry Food and Processes of Producing Same, of which the following is a specification.

The object of my invention is first, the production of a new, non-perishable, marketable, inexpensive, plentiful and nourishing cattle food from the entire (except the roots) plant of the so-called prickly pear cactus (*Opuntia*); second the production of a new poultry food in a marketable condition, from the same plant, the same being fattening and egg-producing.

As is well known southwest Texas, New Mexico, Arizona and Mexico produce (in a wild state) great quantities of this prickly pear cactus. For many years the plant (leaves and stalks) has been used as a cattle food when other food was scarce. I am aware of the fact that others have attempted to reduce this plant to a cattle food having a marketable value, but, to the best of my knowledge and belief all such efforts have in practice been failures.

As far as I know it is now fed only fresh after the spines have been burned off, this burning of the spines having been accomplished by holding the cactus over the flames of a brush fire. In this state it is not marketable, being perishable and heavy on account of the large quantity of water it contains and is therefore of inferior food value. Another objection to using it in this state is that the spine-burning process referred to is a very laborious and tedious one and is likewise an imperfect one, leaving many spines on the plant to the injury of the cattle.

My process consists in first burning the spines off of the plant, leaves and stalk, either in its growing state or after it has been cut off, by directing blasts of flame from or in a large fire-box or from a so-called "pear-burner." This process also serves to partly roast the product, which is necessary especially in its growing season during warm weather because, being so hardy, it would be hard to dry the same in the open air. Next I chop the material into small pieces with large knives, cleavers, or run the same through a food chopper. Then it is dried in the open air, in winter time. After burning off the spines, whether on its stalk, or after being cut down, cut the plant, stalk and leaves into small pieces, slices or shreds to facilitate drying and then place the same in a clean place exposed to the rays of the sun or in a so-called "drier," to dry. The plant being dormant in winter time can readily be dried, which is not the case in its growing season when it will not dry as it should. This fact is one of my chief discoveries. It is necessary for the material to become thoroughly dried out (brittle) else it cannot be ground to a meal and packed for shipment. The material may also be dried in an oven where it is further sufficiently roasted. When dry I grind it into a meal, fine or coarse, as may be desired and then it is ready to be packed in packages, cartons or bags and shipped to market. By analysis my product shows to contain when dry—

6.18% of water,
    17.3 % ash (mineral),
    5.92% protein,
    1.78% fat,
    58.8 % carbo-hydrates,
    10.19% crude fiber.

It is evident that this food is nourishing and from the fact that the plant grows in inexhaustible quantities, that it can be produced at a cost very much less than that of any cattle food now known.

I have experimented and have found that this food mixed with a certain amount of cotton-seed meal will make a balanced ration for milk as well as for beef-cattle.

The finished product fed as a wet mash by itself or mixed in desired proportions with bran, cotton-seed meal, alfalfa meal, or of any commercial poultry mash makes a valuable poultry food.

In its dry state after having been reduced to a meal it can be easily shipped in sacks as bran, shorts or other foodstuffs are now shipped.

What I claim is—

1. The herein-described process of producing a cattle and poultry food which consists in burning the spines off the standing "prickly pear" (*Opuntia*) cactus plants in the winter time when the plants are dormant; cutting off the entire plant above the ground, chopping the same into small pieces or slices and drying the same in the rays of the sun or a so-called "drier."

2. The herein described process of producing a cattle and poultry food which consists in burning the spines off from the leaves and stalks of the standing "prickly pear" (*Opuntia*) cactus plants by means of a directed flame, cutting off the said leaves and stalks and comminuting the same, drying the resultant material in winter time.

3. The herein described process of producing a cattle and poultry food which consists in burning the spines off from the leaves and stalks of the "prickly pear" (*Opuntia*) cactus plants during their dormant season, by directing against these leaves and stalks blasts of flames from a "pear burner," cutting off said leaves and stalks and reducing the same to a finely chopped material, drying this material in the open air, in the rays of the sun, in winter time, and then grinding the same into a marketable meal.

4. The herein described cattle and poultry food consisting of ground meal made from winter dried "prickly pear" (*Opuntia*) cactus.

HERMAN HIRSCH.

Witnesses:
PAUL H. SCHOLZ,
T. G. ROGERS.

Copies of this patent may be obtained for five cents each, by addressing the "Commissioner of Patents, Washington, D. C."